United States Patent
Hinz et al.

(10) Patent No.: US 6,648,614 B1
(45) Date of Patent: Nov. 18, 2003

(54) PISTON PUMP

(75) Inventors: Axel Hinz, Neu-Anspach (DE); Hans-Dieter Reinartz, Frankfurt am Main (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 10/019,209

(22) PCT Filed: May 12, 2000

(86) PCT No.: PCT/EP00/04296

§ 371 (c)(1), (2), (4) Date: Dec. 19, 2001

(87) PCT Pub. No.: WO00/78585

PCT Pub. Date: Dec. 28, 2000

(30) Foreign Application Priority Data

Jun. 19, 1999 (DE) .......................................... 199 28 164

(51) Int. Cl.$^7$ ................................................. F04B 19/00
(52) U.S. Cl. ........................ 417/470; 417/549; 417/552; 417/554
(58) Field of Search ................................. 417/470, 552, 417/554, 549; 92/81, 142

(56) References Cited

U.S. PATENT DOCUMENTS

| | | | |
|---|---|---|---|
| 4,778,350 A | | 10/1988 | Sugisawa et al. |
| 5,577,896 A | * | 11/1996 | Harada ........................ 417/549 |
| 5,588,817 A | * | 12/1996 | Zirps et al. .................. 417/549 |
| 5,984,651 A | * | 11/1999 | Beck et al. .................. 417/470 |
| 6,161,466 A | * | 12/2000 | Schuller et al. ............. 417/470 |
| 6,171,083 B1 | * | 1/2001 | Schuller ...................... 417/549 |
| 6,193,481 B1 | * | 2/2001 | Alaze et al. ................. 417/549 |
| 6,276,909 B1 | * | 8/2001 | Siegel et al. ................ 417/470 |
| 6,283,724 B1 | * | 9/2001 | Alaze et al. ................. 417/470 |
| 6,514,056 B1 | * | 2/2003 | Schuller et al. ............. 417/549 |

FOREIGN PATENT DOCUMENTS

| | | | |
|---|---|---|---|
| DE | 43 16 986 | 11/1994 | ................. 417/470 |
| DE | 07978 | 9/1995 | |
| DE | 44 14 400 | 11/1995 | |
| DE | 197 32 817 | 2/1999 | |
| DE | 198 31 450 | 2/1999 | |
| EP | 0 631 050 | 12/1994 | ................. 417/549 |
| EP | 0 918 158 | 5/1999 | |
| EP | 0 928 894 | 7/1999 | |
| WO | 96 28661 | 9/1996 | ................. 417/470 |
| WO | WO 99/06695 A1 * | 2/1999 | ................. 417/470 |
| WO | 99 06698 | 2/1999 | ................. 417/470 |

OTHER PUBLICATIONS

Search Report of German Patent Office for Appln 19928164.5.

* cited by examiner

Primary Examiner—Cheryl J. Tyler
(74) Attorney, Agent, or Firm—Rader, Fishman & Grauer PLLC

(57) ABSTRACT

The present invention relates to a piston pump, which is in particular appropriate for the pressure fluid delivery in electronically controlled brake systems, including a housing, a suction valve, a pressure valve, and a pump piston that is designed as a stepped piston having a large-diameter portion and a small-diameter portion. According to the present invention, the stepped piston at its large-diameter portion is guided in a pump cartridge. Preferably, the pressure valve is designed additionally at the cartridge in a radial direction relative to the direction of movement of the stepped piston.

10 Claims, 2 Drawing Sheets

PISTON PUMP

TECHNICAL FIELD

The present invention relates to a piston pump, which is appropriate in particular for the pressure fluid delivery in electronically controlled brake systems, including a pump piston that is designed as a stepped piston.

BACKGROUND OF THE INVENTION

A generic stepped piston pump is e.g. disclosed in German patent application DE 43 16 986 A1. Pumps with a stepped piston of this type are employed especially in electronically controlled brake systems where they cause a reduction of the aspiration resistance of the pump by means of a charging effect. In this arrangement, the pressure in a supply chamber on the suction side of the pump will be increased due to the stepped piston during a suction stroke of the stepped piston pump. An improved delivery rate of the pump and a quicker response time of the electronically controlled brake system is achieved thereby in particular at low temperatures and low viscosity of the pressure fluid. This is especially important in the case of traction slip control or driving stability control operations.

However, especially in these applications the generic piston pump suffers from the disadvantage that the pump piston is guided directly in the housing. Chips may develop due to wear between the piston and the housing and may get into the brake circuit. Therefore, the bearing surface must undergo a special machining operation which causes additional costs of manufacture. Further, this piston pump necessitates a relatively large mounting space due to the axial series connection of the pressure valve and the suction valve.

BRIEF SUMMARY OF THE INVENTION

An object of the present invention is to reduce the manufacturing costs for a generic piston pump and to improve the reliability in operation of the pump. Another objective is to minimize the number of assemblies.

This object is achieved according to the present invention in that the stepped piston of a generic piston pump at its large-diameter portion is guided in a pump cartridge. The inner side of the cartridge serves as a bearing surface for the portion of the stepped piston that has the large diameter. Thus, this bearing surface advantageously permits either being machined outside the pump housing or being made with the corresponding required surface quality directly when the pump cartridge is manufactured.

It is preferred that the pressure valve is designed radially to the direction of movement of the stepped piston. This arrangement of the pressure valve renders it possible to reduce the mounting space that is required in an axial direction. It is especially favorable that the pump cartridge thus combines the functions of guiding the piston and retaining the pressure valve. According to the present invention, this reduces the number of the necessary assemblies which leads to another cost reduction. For ease of manufacture or machining the pump cartridge is preferably made of plastics or a sintered metal.

In a favorable aspect of the present invention, a part of a suction channel of the piston pump is arranged close to the outside edge of the pump housing. This is advantageous because the suction channel provides a better access for connecting elements such as hydraulic lines, etc., at the outside end of the housing, which e.g. may be the valve block of a brake assembly. Preferably, another part of the suction channel is provided in the pump cartridge. The suction path of the pressure fluid from the connecting element to the suction valve hence leads through the cartridge in particular. Preferably, another part of the suction channel extends through the stepped piston itself, and the suction valve is designed directly or indirectly on the stepped piston.

It is particularly favorable that a filter element is provided in the suction channel between the pump cartridge and the stepped piston. According to the present invention, the filter element protects at this preferred location both the suction valve and the subsequent pressure valve against contaminants.

To seal the supply chamber against the drive elements of the piston pump, a seal is further provided advantageously in the pump housing adjoining the small-diameter portion of the stepped piston. This seal is not arranged at the piston but in a bore in the housing, which is in contrast to the state of the art. In addition or separately, a wear-resistant element may be provided in the pump housing and serve in a favorable way as a bearing surface for that part of the stepped piston which has a small diameter.

It is especially advantageous that the seal and/or the wear-resistant element is retained in the housing by means of the filter element, whereby an additional retaining ring becomes unnecessary and the number of component parts is further reduced.

The housing of the piston pump of the present invention is closed towards the outside in particular by means of a cover which is calked or clinched in the housing. The cover may be designed integrally with the pump cartridge, or separately.

DETAILED DESCRIPTION OF THE PREFERRED EMBODIMENTS

Figure 1:
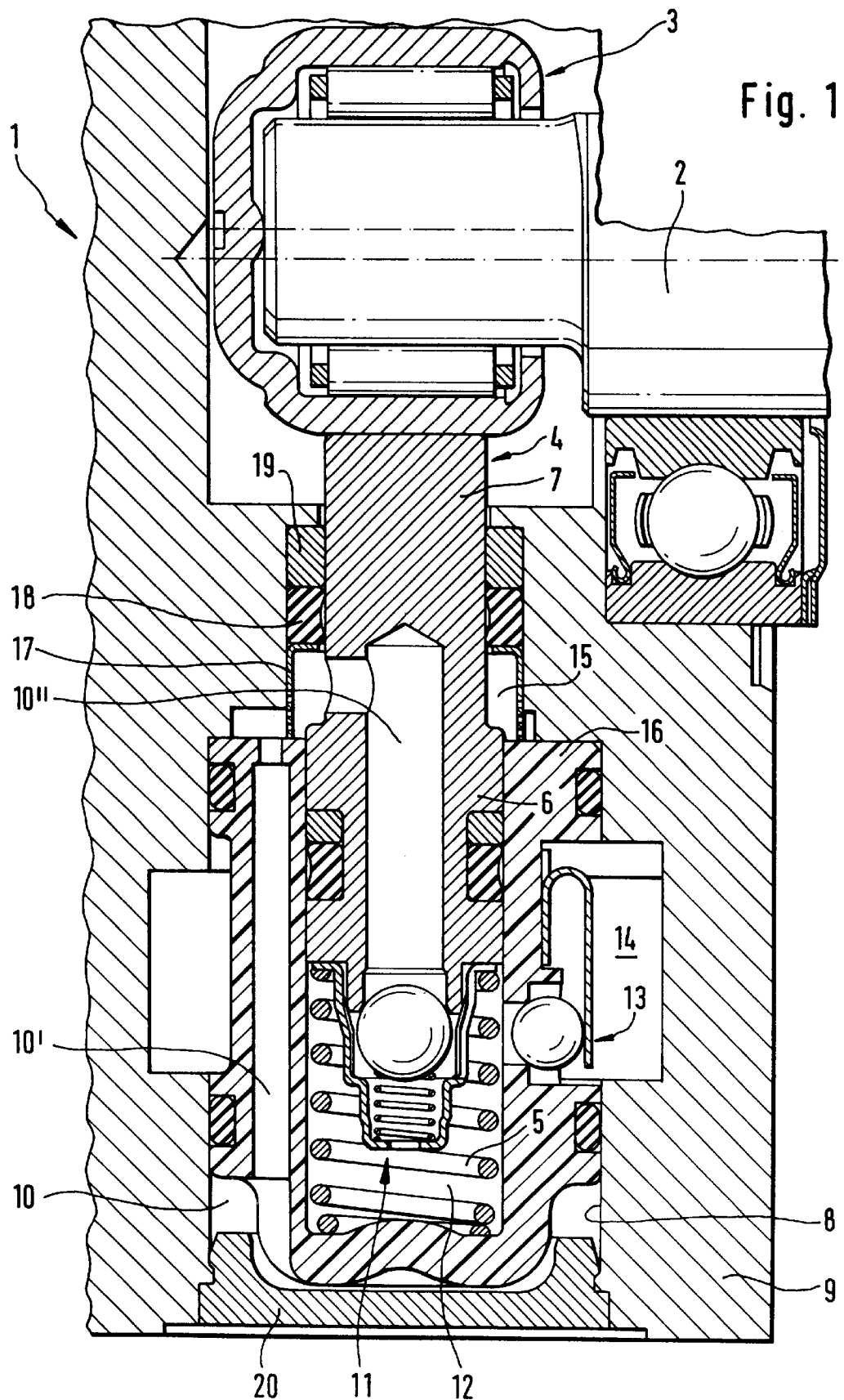
FIG. 1 is an enlarged longitudinal cross-sectional view of a part of a piston pump of the present invention.

A cross-sectional view of the section of a piston pump 1 of the present invention which is relevant for the invention is illustrated in FIG. 1. Piston pump 1 is appropriate for use in an electronically controlled brake system such as ABS (anti-lock system), TCS (Traction Slip Control), or ESP (Electronic Stability Program) in particular. The piston pump 1 includes a drive shaft 2 which is driven by an electric motor (not shown) in a per se known fashion. An eccentric 3 designed on the drive shaft 2 bears against one or more pump pistons 4, and the rotation of the drive shaft 2 is converted into a stroke movement of the pump pistons 4 by the eccentric 3. The pump pistons 4 are biassed in relation to the eccentric 3 by means of a resetting spring 5 so that the pistons 4 are always in contact with the eccentric 3.

The pump piston 4 is configured as a stepped piston according to the present species and includes a large-diameter portion 6 and a small-diameter portion 7. The stepped piston 4 is arranged within a bore 8 of pump housing 9 having several steps, and the pump housing may e.g. be the valve block of an electronically controlled brake system. When the piston pump 1 performs a suction stroke, pressure fluid is aspirated into a working chamber 12 of piston pump 1 by way of a suction channel 10, 10', 10" and a suction valve 11 that is preferably designed at the piston 4. In the subsequent pressure stroke of the piston pump 1, the pressure fluid is conducted from the working chamber 12 into a pressure channel 14 by way of a pressure valve 13, with the suction valve 11 being closed then, and from there it propagates to non-illustrated wheel brakes of an automotive vehicle, for example. As has already been mentioned in the above introduction, pressure increase will be caused by the stepped piston 4 in a supply chamber 15 on the suction side of pump 1 at the end of the suction stroke of the piston pump 1. The result is an improved delivery rate of the pump 1 and a quicker response time of the electronically controlled brake system during the subsequent pressure stroke, in particular at low temperatures and a low viscosity of the pressure fluid. This is especially important in the case of traction slip control or driving stability control operations.

According to the present invention, the stepped piston 4 at its large-diameter portion 7 is guided in a pump cartridge 16. Thus, the inside of the pump cartridge 16 serves as a bearing surface for the stepped piston 4. Favorably, this bearing surface may thus be either machined outside the pump housing 9 or may be made with the corresponding surface quality directly during manufacture of the pump cartridge 16.

It is especially advantageous that the pressure valve 13 is designed at the pump cartridge 16 radially relative to the direction of movement of the stepped piston 4. The mounting space required in an axial direction can be reduced due to the preferred radial arrangement of the pressure valve 13 compared to the state of the art. The advantage is that the housing 9 or a valve block, and hence the entire brake assembly, may be minimized in dimensions. This is especially favorable in automotive vehicles where only a very limited mounting space is available in the engine compartment due to different electronic systems.

Besides, the number of the necessary assembly units is reduced in an especially favorable manner due to the preferred double function of the pump cartridge 16 which retains the pressure valve 13, on the one hand, and guides the piston 4, on the other hand, with the result of further cost reduction during manufacture of the piston pump 1 of the present invention. For ease of machining, the pump cartridge 16 is preferably made of plastics or a sintered metal, while the pump cartridge 16 in the embodiment shown is composed of plastics.

In a preferred embodiment of the present invention, a part 10 of the suction channel 10, 10', 10" of the piston pump 1 is arranged close to the outside edge of the pump housing 9. This is advantageous because the suction channel 10 in this location provides especially good access for connecting elements such as hydraulic lines, etc. In addition, part of the suction channel 10, 10', 10" is arranged at this location anyway in novel hydraulic assemblies which are conventionally rated for pistons with a constant diameter. In particular when another part 10' of the suction channel 10, 10', 10" is provided within the pump cartridge 16, the stepped piston 4 can be mounted in a simple fashion into existing structural elements such as e.g. a valve block of a brake assembly which, in turn, leads to a reduction in the multitude of variants. Thus, a valve block of this type can be used in a particularly favorable manner for both conventional pistons and for stepped pistons. The suction path of the pressure fluid from a non-illustrated connecting element to the suction valve 11 consequently leads through the cartridge 16 in particular. One or several channels 10' can be provided in the pump cartridge 16.

Preferably, another part 10" of the suction channel 10, 10', 10" extends through the stepped piston 4, and the suction valve 11 is designed especially at an end of the stepped piston 4 that is directed towards the working chamber 12.

In a particularly favorable manner, a filter element 17 that is preferably designed as a sheet-metal part is provided in the suction channel 10, 10', 10" in the suction path between the pump cartridge 16 and the stepped piston 4. The filter element protects at this preferred location both the suction valve 11 and the subsequent pressure valve 13 against contaminants.

It is preferred that a seal 18 is provided at the location of the small-diameter piston portion 6 in the pump housing 9 to seal the supply chamber 15 with respect to the drive elements 2, 3 of the piston pump 1 in a favorable manner. In contrast to the state of the art, this seal 18 is not arranged at the piston 4 but in a bore 8 of the housing 9. In addition or separately, a wear-resistant element 19 may be provided at this location in the pump housing 9, which element favorably serves as a bearing surface for that part 7 of the stepped piston 4 which has a small diameter.

It is especially suitable that the seal 18 and/or the wear-resistant element 19 is retained in the housing 9 by means of the filter element 17, what obviates the need for an additional retaining ring or a like element and further reduces the number of component parts according to the present invention.

The housing of the piston pump 1 according to the present invention is closed towards the outside by means of a cover 20 in an improvement of the present invention. The cover 20 is preferably calked with the housing 9 or clinched into the housing 9. In the embodiment of FIG. 1, the cover 20 is designed as a separate component part and retains the pump cartridge 16 in the housing 9.

Figure 2:
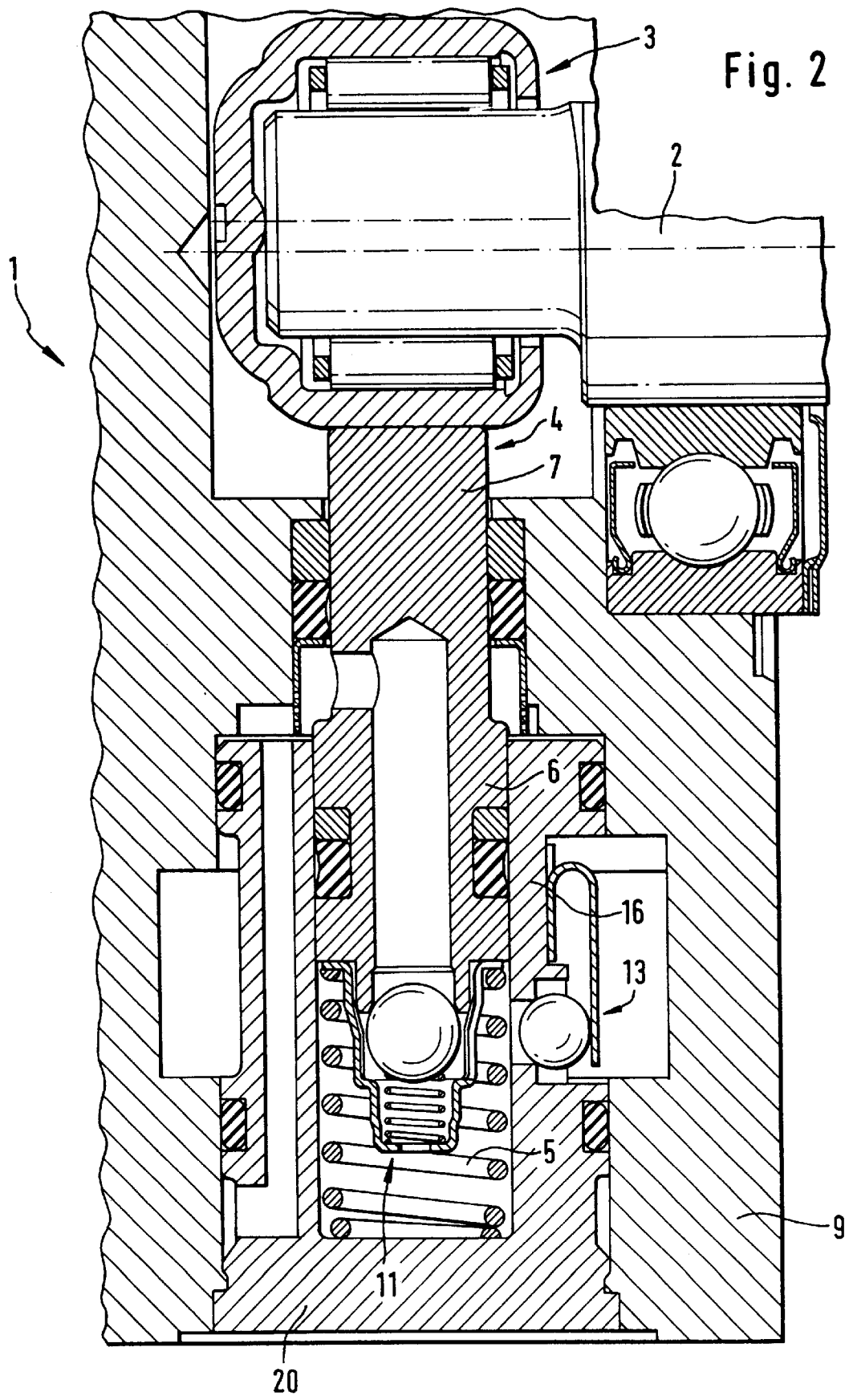
FIG. 2 is a longitudinal cross-sectional view of a second embodiment of the piston pump of the present invention.

FIG. 2 shows another embodiment of the present invention in a longitudinal cross-sectional view. For the description of the individual component parts and the operation of the pump 1, reference is made to the above explanations about FIG. 1. The difference over FIG. 1 essentially consists in that the cover 20 is of integral design with the pump cartridge 16. This will further minimize the number of component parts in a preferred aspect of the present invention. In this embodiment, the pump cartridge 16 is preferably made of a sintered metal which has a higher compression strength compared to plastics.

List of Reference Numerals 1 piston pump
2 drive shaft
3 eccentric
4 pump or stepped piston
5 resetting spring
6 large-diameter piston portion
7 small-diameter piston portion
8 bore
9 pump housing
10 suction channel
10' suction channel
10" suction channel
11 suction valve
12 working chamber
13 pressure valve
14 pressure channel
15 supply chamber
16 pump cartridge
17 filter element
18 seal
19 wear-resistant element
20 cover

What is claimed is:

1. Piston pump, in particular for the pressure fluid delivery in electronically controlled brake systems, comprising:
   a housing,
   a suction valve,
   a pressure valve, and
   a stepped piston having a large-diameter portion, and a small-diameter portion, wherein the stepped piston at its large-diameter portion is guided in a pump cartridge, wherein the pump cartridge defines at least a portion of at least one suction channel extending substantially along the length of the pump cartridge and parallel to a direction of movement of the stepped piston guided therein and wherein the pump cartridge is in continuous, fluidic communication with the suction valve.

2. Piston pump as claimed in claim 1, wherein the pressure valve is provided at the pump cartridge and designed radially relative to a direction of movement of the stepped piston.

3. Piston pump as claimed in claim 1, wherein the pump cartridge is made of plastics or a sintered metals.

4. Piston pump as claimed in claim 1, the piston pump further comprising a suction channel, wherein a part of the suction channel is provided close to an outside edge of the pump housing.

5. Piston pump as claimed in claim 4, wherein a part of the suction channel extends through the stepped piston, and the suction valve is designed at the stepped piston.

6. Piston pump as claimed in claim 5, wherein a filter element is provided in the pump housing adjacent to the small-diameter portion of the stepped piston.

7. Piston pump as claimed in claim 1, wherein a seal and a wear-resistant element is provided in the pump housing adjacent to the small-diameter portion of the stepped piston.

8. Piston pump as claimed in claim 7, the piston pump further comprising a suction channel, wherein the seal and the wear-resistant element is retained in the housing by means of a filter element provided in the suction channel between the pump cartridge and the stepped piston.

9. Piston pump as claimed in claim 1, wherein the housing is closed towards the outside by means of a cover calked in the housing.

10. Piston pump as claimed in claim 9, wherein the cover is designed integrally with the pump cartridge.

* * * * *